US012748076B2

(12) United States Patent
Cardoso et al.

(10) Patent No.: US 12,748,076 B2
(45) Date of Patent: Sep. 29, 2026

(54) METHOD FOR DISPLAYING IN REAL TIME A SIGNAL FOR NON-DESTRUCTIVE TESTING OF A MECHANICAL PART

(71) Applicant: COMMISSARIAT A L'ENERGIE ATOMIQUE ET AUX ENERGIES ALTERNATIVES, Paris (FR)

(72) Inventors: Michel Cardoso, Gif-sur-Yvette (FR); Florence Grassin, Gif-sur-Yvette (FR); Vincent Saint Martin, Gif-sur-Yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 288 days.

(21) Appl. No.: 18/687,767

(22) PCT Filed: Aug. 30, 2022

(86) PCT No.: PCT/EP2022/074036
§ 371 (c)(1),
(2) Date: Feb. 28, 2024

(87) PCT Pub. No.: WO2023/031168
PCT Pub. Date: Mar. 9, 2023

(65) Prior Publication Data
US 2024/0353374 A1 Oct. 24, 2024

(30) Foreign Application Priority Data
Aug. 31, 2021 (FR) ....................................... 2109076

(51) Int. Cl.
*G01N 29/06* (2006.01)
*G01N 29/265* (2006.01)

(52) U.S. Cl.
CPC ..... *G01N 29/0663* (2013.01); *G01N 29/0609* (2013.01); *G01N 29/265* (2013.01)

(58) Field of Classification Search
CPC ............. G01N 29/0609; G01N 29/265; G01N 29/0663
(Continued)

(56) References Cited

U.S. PATENT DOCUMENTS

2021/0389119 A1* 12/2021 Cardoso ............... G01B 11/007

FOREIGN PATENT DOCUMENTS

DE 10 2016 003 543 A1 1/2017

OTHER PUBLICATIONS

Debois, "Hololens for Augmented Reality NDT", NI Labview Board, Nov. 13, 2016 (Year: 2016).*
(Continued)

*Primary Examiner* — Nathaniel T Woodward
(74) *Attorney, Agent, or Firm* — BakerHostetler

(57) ABSTRACT

A method is provided for visualizing, in real time, a signal emitted by a non-destructive testing device including a rigid body, a non-destructive testing sensor connected to the rigid body, and an augmented reality visualization device. The method includes: emitting and receiving the signal by way of the sensor; determining a cut-out of an occlusion inside the mechanical part; determining a signal visualization surface constructed from the paths of the signal; and visualizing a superimposed real view and holographic 3D representation of the mechanical part, of the non-destructive testing sensor, a holographic representation of the cut-out of the occlusion and of the signal visualization surface, which are superimposed on the real view.

9 Claims, 11 Drawing Sheets

(58) Field of Classification Search
USPC .......................................................... 73/603
See application file for complete search history.

(56) References Cited

OTHER PUBLICATIONS

Dubois, "Hololens for augmented reality NDT-NI community", 2016.
Maria, et al., "Politecnico di milano mechanical department doctoral programme in mechanical engineering low-cost augmented reality for industrial problems", Doctoral Dissertation, 2013.

* cited by examiner

METHOD FOR DISPLAYING IN REAL TIME A SIGNAL FOR NON-DESTRUCTIVE TESTING OF A MECHANICAL PART

CROSS-REFERENCE TO RELATED APPLICATIONS

This application is a National Stage of International patent application PCT/EP2022/074036, filed on Aug. 30, 2022, which claims priority to foreign French patent application No. FR 2109076, filed on Aug. 31, 2021, the disclosures of which are incorporated by reference in their entireties.

FIELD OF THE INVENTION

The present invention lies in the field of the visualization of augmented reality data in 3D space. The invention is described here in the field of non-destructive testing.

BACKGROUND

The invention is presented here, by way of illustration and without limitation, in the field of non-destructive testing with an ultrasonic sensor. It will be clearly apparent to those skilled in the art, on the basis of the description of the invention, that the principle of the invention may be applied to other types of sensors in order to visualize data related to the sensor.

Ultrasonic non-destructive testing is a non-invasive method for detecting defects in a part, based on the emission of ultrasound and the detection of the reflection thereof related to the acoustic interfaces that are encountered.

A suitable sensor emits ultrasound at a frequency (generally between 500 kHz and 100 MHz) that is chosen depending on the nature of the part to be tested. The sensor must be in direct contact with the part in order for the waves that are propagated not to be slowed down by the impedance of the air between the point of emission of the sensor and the part.

The waves are reflected from the acoustic interfaces that are encountered: contours of the part, internal defects.

The sensor, placed in contact with the part to be tested, intercepts the waves re-emitted by a potential defect.

The detected waves are converted into signals by an associated electronic assembly of the sensor. Software combines these signals to form an image of the inside of the part. Analyzing the images makes it possible to discriminate echoes caused by a defect from those related to the geometry of the part.

In the field of non-destructive testing, an operator scans the sensor over an entire predefined examination area of the part to be tested. It is vital that the entire area is scanned by the sensor. The set of coordinates of the point of emission of the signal is a crucial element for verifying that the entire area has been scanned correctly. Furthermore, in addition to knowing that the entire area has been scanned, it is advantageous for the operator to detect, during the test, whether an area deserves special attention.

The technical problem that arises is that of visualizing data positioned in 3D in augmented reality, while at the same time giving the user the impression of seeing inside the part. Indeed, a 3D surface displayed as a hologram appears to float in space, even if its position has been defined precisely in relation to the 3D volume of the part. This means that a simple hologram display is not enough to give the impression of depth and allow the brain to interpret the data as though they were inside the part.

SUMMARY OF THE INVENTION

The invention aims to overcome all or some of the problems cited above by proposing a visualization method and device that make it possible to present, in real time, the acquired data, that is to say the spatialized signals, in the form of a holographic 3D surface positioned in the 3D volume in which they were acquired.

To this end, one subject of the invention is a method for visualizing, in real time, a signal for the non-destructive testing of a mechanical part, the signal being emitted by a non-destructive testing device comprising:

- an optical motion tracking system to which a reference coordinate system is tied,
- sensor holder,
- a rigid body,
- a non-destructive testing sensor integral with the sensor holder connected fixedly to the rigid body,
- a computer,
- the visualization method being carried out by an augmented reality visualization device facing the mechanical part, to which an augmented reality coordinate system is tied,
- the method being characterized in that it comprises the following steps:
  - Moving the non-destructive testing sensor over an examination area of the mechanical part;
  - At the same time as the step of moving the non-destructive testing sensor, emitting the signal from a point of emission along an emission axis and receiving the signal by way of the sensor;
  - Determining, by way of the computer, a cut-out of an occlusion inside the mechanical part, the cut-out being centered around the point of emission;
  - Determining, by way of the computer, a signal visualization surface constructed from the ultrasonic paths of the signal, this surface being located inside the cut-out;
  - Visualizing, on the augmented reality visualization device,
    - a real view of the mechanical part, of the sensor holder and of the non-destructive testing sensor,
    - a holographic 3D representation of the mechanical part, of the sensor holder and of the non-destructive testing sensor,
    - which are superimposed on the real view,
    - a holographic representation of the cut-out of the occlusion of the part and of the signal visualization surface, which are superimposed on the real view,
  - the occlusion being produced at least partially by superimposing the holographic 3D representation of the mechanical part (7') on the real view of the mechanical part (7),
  - the cut-out (80) of the occlusion passing through the depth of the mechanical part in its holographic 3D representation (7') until reaching the signal visualization surface (81),
  - the signal visualization surface (81) being a quadric that is determined so as to correspond to a mesh formed by the paths of said signals propagating in the mechanical part.

Advantageously, the orientation of the cut-out is related to the location of the augmented reality visualization device.

Advantageously, the holographic 3D representations are visualized in transparency.

Advantageously, the step of determining the intersection surface comprises the following steps:

Computing the paths taken by the signal emitted by the sensor;

Creating a 3D mesh representative of the mechanical part, of the sensor holder, of the non-destructive testing sensor, and of the paths taken by the signal;

Mapping the paths taken by the signal onto the 3D mesh.

Advantageously, the visualization method according to the invention comprises, beforehand, a step of calibrating the augmented reality visualization device in the reference coordinate system.

Advantageously, the visualization method according to the invention comprises, prior to the step of calibrating the augmented reality visualization device in the reference coordinate system, a step of calibrating the non-destructive testing device.

The invention also relates to a device for visualizing, in real time, a signal for the non-destructive testing of a mechanical part, the device comprising a non-destructive testing device comprising:

an optical motion tracking system to which a reference coordinate system is tied, a sensor holder, a first rigid body, a non-destructive testing sensor integral with the sensor holder connected fixedly to the first rigid body, the sensor being intended to be moved over an examination area of the mechanical part, and to emit the signal from a point of emission and receive the signal along an emission axis, a computer, the device (10) furthermore comprising an augmented reality visualization device facing the mechanical part, to which an augmented reality coordinate system is tied, the non-destructive testing device being characterized in that the computer is configured to Determine a cut-out of the occlusion of the mechanical part, the cut-out being centered around the point of emission;

Determine a signal visualization surface constructed from the ultrasonic paths of the signal, this surface being located inside the cut-out;

and the augmented reality visualization device is configured to display:

a real view of the mechanical part, of the sensor holder and of the non-destructive testing sensor, a holographic representation of the mechanical part, of the sensor holder and of the non-destructive testing sensor, which are superimposed on the real view, a holographic representation of the cut-out of the occlusion of the part and of the signal visualization surface, which are superimposed on the real view, the occlusion being produced at least partially by superimposing the holographic 3D representation of the mechanical part (7') on the real view of the mechanical part (7), the cut-out (80) of the occlusion passing through the depth of the mechanical part in its holographic 3D representation (7') until reaching the signal visualization surface (81), the signal visualization surface (81) being a quadric that is determined so as to correspond to a mesh formed by the paths of said signals propagating in the mechanical part.

Advantageously, the testing device according to the invention furthermore comprises a pointing device comprising a tip and connected fixedly to a second rigid body, the pointing device being able to determine the position of points on a surface.

The invention also relates to a computer program comprising instructions that cause the device according to the invention to carry out the steps of the method according to the invention.

The invention also relates to a computer-readable recording medium on which said computer program is recorded.

BRIEF DESCRIPTION OF THE DRAWINGS

The invention will be better understood and other advantages will become apparent on reading the detailed description of an embodiment given by way of example, which description is illustrated by the appended drawing, in which.

DETAILED DESCRIPTION

For the sake of clarity, the same elements bear the same reference signs in the various figures. For a better view and for the sake of greater understanding, the elements are not always shown to scale. The term user, operator or tester is used to designate the tangible person who carries out the non-destructive test, that is to say who manipulates and scans the sensor (and sensor holder) over the mechanical part.

The object of the invention is based on a visualization device and method that allow the user to visualize data (ultrasonic signals) positioned in 3D in augmented reality, giving the user the impression of seeing inside the part. Augmented reality consists in superimposing virtual elements on the real world. The device comprises notably an optical positioning system, and an augmented reality visualization device. And it is necessary to register the two 3D environments (real 3D scene and 3D representation of the data) by applying augmented reality rendering techniques such as transparencies, occlusions, cutting planes in a material recess. The aim of the invention is to allow the tester to be completely immersed in the part and thereby focus on the non-destructive test signals positioned precisely in the geometry.

Figure 1:
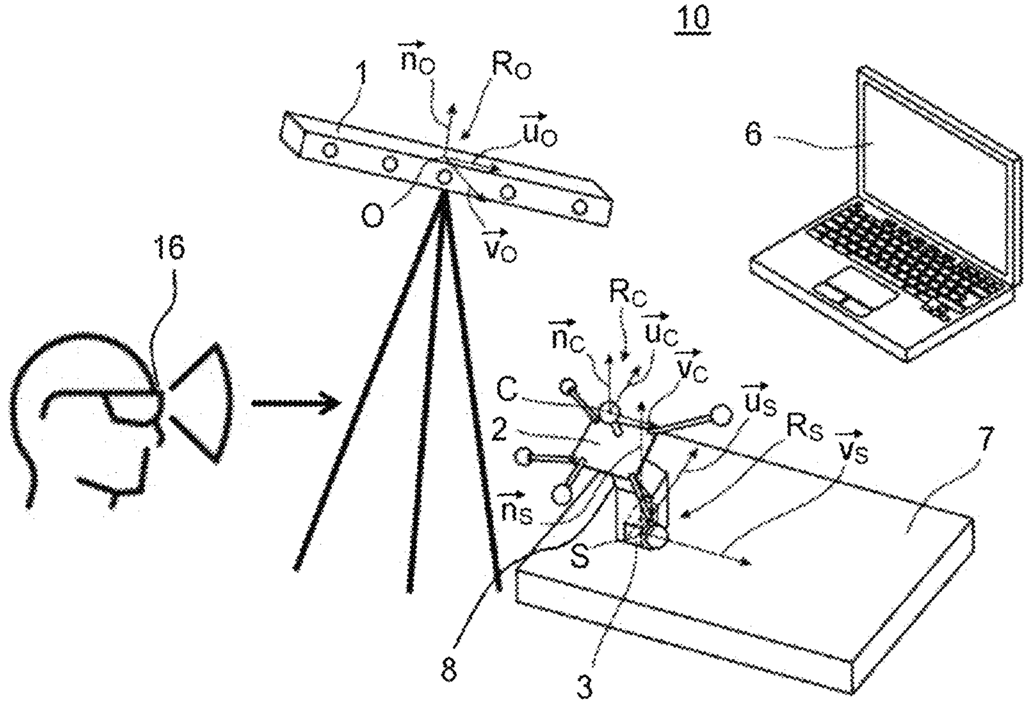
FIG. 1 schematically shows a non-destructive testing device according to one embodiment of the invention.

FIG. 1 schematically shows a non-destructive testing device 10 according to one embodiment of the invention. The device 10 for the non-destructive testing of a mechanical part comprises an optical motion tracking system 1 that has the role of tracking the movement of an object in space, and more particularly the movement of rigid bodies as described below.

The optical motion tracking system 1 is associated with an orthonormal coordinate system $R_0=(0, \vec{u}_0, \vec{v}_0, \vec{n}_0)$, where O is the origin of the coordinate system and $\vec{u}_0, \vec{v}_0, \vec{n}_0$ are mutually orthogonal normalized vectors.

The optical motion tracking system 1 determines the Cartesian coordinates and the orientation of a rigid body in the orthonormal coordinate system of the optical motion tracking system 1.

The optical motion tracking system 1 comprises at least two cameras and one or more infrared emitters. Other types of optical system may be used within the scope of the invention, for example a laser-based optical system and/or an optical system with non-3D dot-type markers. It is important to note that the system 1 may be a passive (optical or non-optical) motion tracking system.

The non-destructive testing device 10 comprises a first rigid body 2 connected to a probe, or sensor, 3 and a sensor holder 8. The sensor 3 is integral with the sensor holder 8 connected fixedly to the first rigid body 2. The first rigid body 2, the sensor holder 8 and the sensor 3 are connected fixedly and form an indivisible assembly during the non-destructive test. The first rigid body 2 comprises at least three spherical infrared-reflecting targets located at distinct positions. The first rigid body 2 is associated with an orthonormal coordinate system $R_C=(C, \vec{u}_C, \vec{v}_C, \vec{n}_C)$, where C is the origin of the coordinate system and $\vec{u}_C, \vec{v}_C, \vec{n}_C$ are mutually orthogonal normalized vectors.

In one preferred embodiment, the first rigid body 2 comprises six spherical targets. The sensor 3 is for example a single-element ultrasonic probe. It comprises an emitting and receiving surface, referred to as active surface, 31. The active surface 31 is a rectangle with a flat surface. As a variant, the sensor 3 is of another type, for example an eddy current probe. Generally speaking, an active surface is any surface that emits or receives tangible signals belonging to a non-destructive testing sensor. For example, in the case of a single-element ultrasonic sensor in contact, this corresponds to the surface of the piezoelectrics. In the case of a single-element ultrasonic sensor with a "Plexiglas" shoe, this corresponds to the surface of the shoe through which the ultrasonic signals are emitted.

The testing device 10 comprises an augmented reality visualization device 16 facing the mechanical part 7, to which an augmented reality coordinate system ($R_A$) is tied. It is through this visualization device 16 that the operator sees the real mechanical part, and it is on this visualization device 16 that the holographic 3D representations (described in detail later) are displayed, superimposed on the view of the mechanical part on the visualization device 16.

These holographic 3D representations may form occlusions of the mechanical part 7 in the sense that they are fully or partially superimposed on the real mechanical part 7. In particular, a holographic 3D representation of the mechanical part may be superimposed on the real mechanical part 7, and thus form an occlusion.

An occlusion may consist of the envelope of the virtual representations of the mechanical part to be tested and/or of the sensor and/or of the sensor holder.

It is possible to add information about the occlusion, such as areas of coverage or welds, and also to cut out this occlusion in order to reveal signals.

The testing device 10 comprises a computer 6 configured to a. determine a cut-out of the occlusion of the holographic representation of the mechanical part 7, the cut-out being centered around the point of emission;

b. determine a signal projection (or visualization) surface constructed from the ultrasonic paths of the ultrasonic signals delivered by the sensor 3. This surface corresponds to the intersection of the plane containing the emission axis in the cut-out of the occlusion. In other words, the signal visualization surface is a quadric, or square surface, computed so as to correspond as best possible to the mesh formed by the ultrasonic paths.

The term occlusion means concealing real objects behind virtual objects. Occlusion occurs when an object in a 3D space blocks the view of another object. In augmented reality, computer-generated objects are placed in a real scene so as to provide additional information or change the nature of real objects. Thus, virtual objects and the real scene have to be perfectly aligned in order to maintain high levels of realism and allow objects to behave as they would under normal conditions. In particular, in the context of the invention, a holographic representation of the mechanical part 7 is superimposed on the real part 7, and thus constitutes a total or partial occlusion.

The cut-out of the occlusion corresponds to an intersection between a 3D surface, for example an ellipsoid, and the signal visualization surface.

The computer 6 makes it possible notably to combine the signals received by the sensor in order to form an image of the inside of the part.

And the augmented reality visualization device 16 is configured to display:

a. a real view of the mechanical part 7, of the sensor holder 8 and of the non-destructive testing sensor 3, b. a holographic representation, in the form of occlusions, of the mechanical part 7', of the sensor holder 8' and of the non-destructive testing sensor 3', which are superimposed on the real view, c. a holographic representation of the cut-out of the occlusion of the part and of the signal visualization surface, which are superimposed on the real view.

The testing device 10 may be calibrated using a method known to those skilled in the art, for example as disclosed in document FR 3 087 254 B1. Hereinafter, and by way of example and without limiting the invention, the testing device 10 is calibrated using another method.

The testing device 10 may comprise a calibration block and, in our calibration example, the computer may be configured to carry out the following steps that will be explained below:

- determining, from three points on a flat upper surface of the calibration block, the length and width of the calibration block;
- determining a first transformation matrix from the reference coordinate system ($R_0$) to a block coordinate system ($R_B$) tied to the calibration block;
- determining, from three points on the first rigid body (2), the length and width of the sensor when it is placed on the flat upper surface of the calibration block;
- determining a second transformation matrix for changing from a coordinate system ($R_H$) tied to the sensor holder to a coordinate system ($R_S$) tied to the sensor.

The computer is furthermore configured to determine a third transformation matrix for changing from the reference coordinate system ($R_0$) to the coordinate system ($R_S$) tied to the sensor.

The invention is described for the tracking of a sensor, but is also applicable to the tracking of multiple sensors, simultaneously and independently.

The non-destructive testing device comprises a computer 6 connected to the optical motion tracking system 1 and to a control module 5.

The computer 6 is for example a computer or an electronic card. It comprises notably a processor running a computer program implementing the method that will be described and a memory for storing the results thereof. It also comprises input and output interfaces and may be associated with a visualization screen.

The link between the computer 6 and the optical motion tracking system 1 may be wired or wireless. Likewise, the link between the computer 6 and the control module 5 may be wired or wireless.

Figure 2:
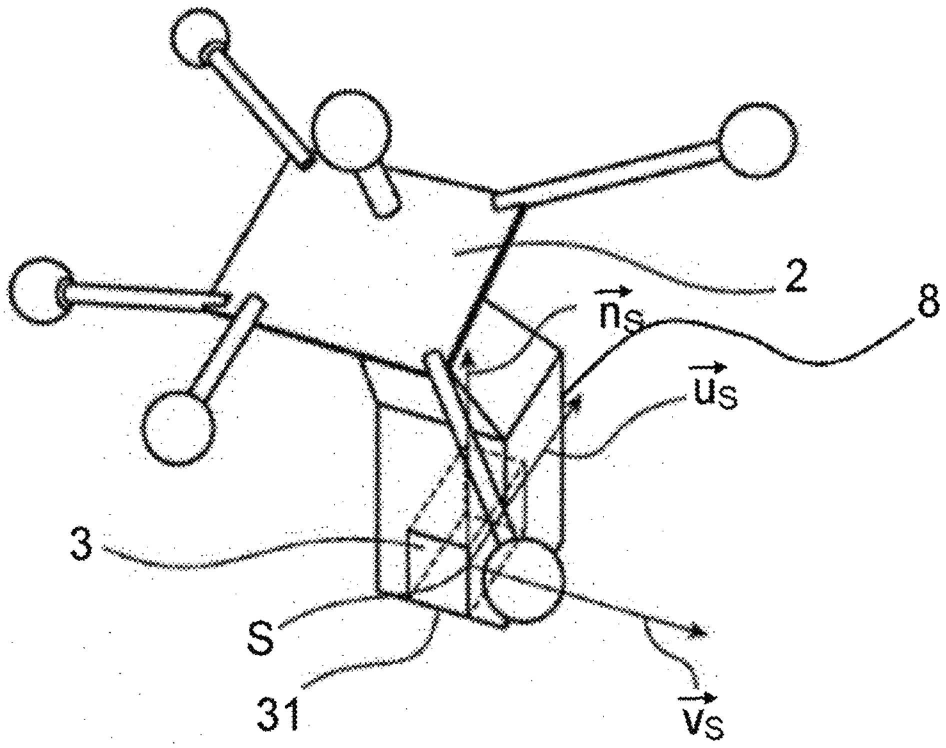
FIG. 2 schematically shows a sensor associated with a sensor holder of a non-destructive testing device according to one embodiment of the invention.

FIG. 2 schematically shows a sensor 3 associated with a sensor holder 8 of a non-destructive testing device 10 according to one embodiment of the invention. The non-destructive testing sensor 3 is integral with the sensor holder 8 connected fixedly to the first rigid body 2. More precisely, the sensor is inserted into a sensor holder, which is integral with a rigid body, allowing it to be located in the coordinate system of the optical positioning system. The lower surface of the sensor extends substantially in the same plane as the lower surface of the sensor holder.

Advantageously, the non-destructive testing device comprises a pointing device 4.

Figure 3:
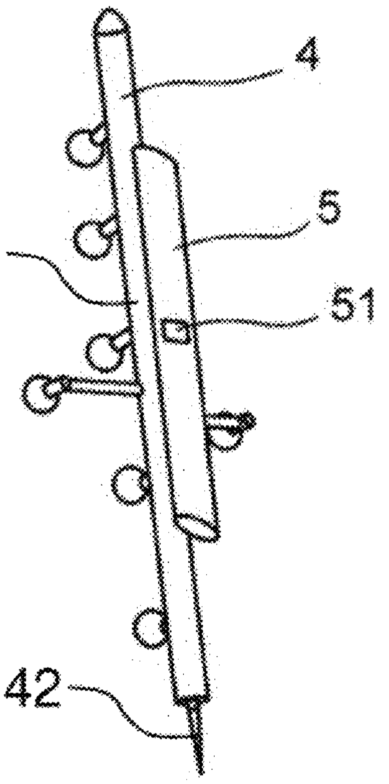
FIG. 3 schematically shows a pointing device according to one embodiment of the invention.

FIG. 3 schematically shows a pointing device 4 according to one embodiment of the invention. The pointing device 4 comprises a second rigid body 41 and a precision tip 42. The second rigid body 41 comprises at least three spherical infrared-reflecting targets located at distinct positions. The shape of the second rigid body 41, that is to say the exact positioning of the spheres with respect to one another, is known in advance. The second rigid body 41 and the precision tip 42 are connected fixedly and form an indivisible assembly. The origin of the second rigid body 41 has been configured beforehand to correspond to the tip 42. The origin of the second rigid body 41 that will be measured by the optical motion tracking system 1 as explained hereinafter thus corresponds exactly to the physical point pointed at with the pointing device.

In one preferred embodiment, the second rigid body 41 comprises seven spherical targets.

The non-destructive testing device comprises a control module 5 equipped with at least one actuation button 51. Preferably, the control module 5 is mounted on the pointing device 4 so as to facilitate use thereof.

Figure 4:
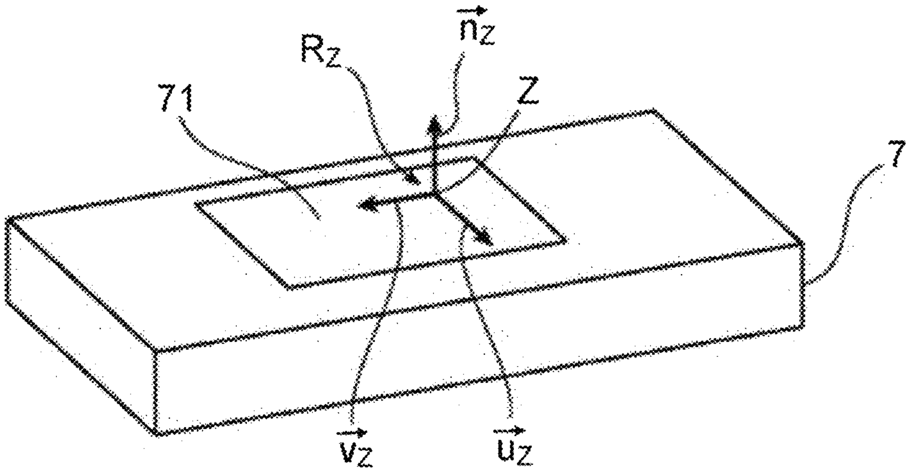
FIG. 4 schematically shows a mechanical part able to be tested by the non-destructive testing device of the invention.

FIG. 4 schematically shows a mechanical part 7 able to be tested by the non-destructive testing device of the invention. The mechanical part to be tested 7 comprises an examination area 71 defined on the surface of the mechanical part 7. The examination area 71 extends over all or a portion of the mechanical part. The examination area is on a portion of the mechanical part that has a surface of known geometric shape, such as a flat surface, a cylindrical surface or else a conical surface, for example. In any case, the geometric shape of the examination area may be represented by an analytical function. As an alternative, it is also possible to work from a mesh of the part resulting for example from CAD (abbreviation for computer-aided design) software.

Figure 5:
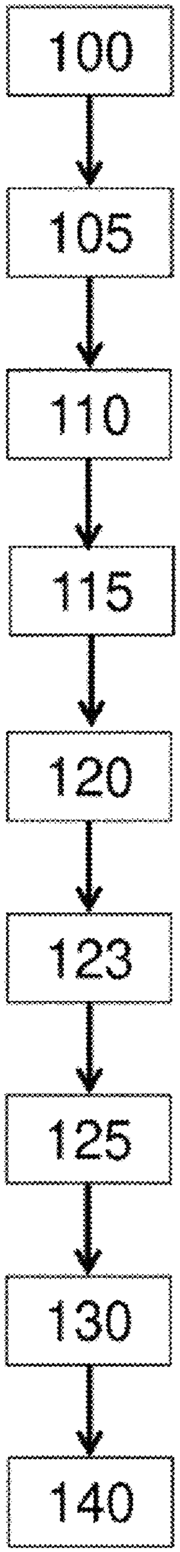
FIG. 5 schematically shows a flowchart of the sub-steps of a calibration step able to be used in the invention.

FIG. 5 schematically shows a flowchart of the sub-steps of a calibration step able to be used in the invention. Hereinafter, we will use the following letters:

- R to qualify a coordinate system
- C to qualify the center (or origin) of a coordinate system
- I, J and K to qualify the unit vectors of a coordinate system respectively along the axes x, y and z of this same coordinate system
- P or Q to qualify a point
- V to qualify a vector
- T to qualify a transformation matrix
- L to qualify a length
- W to qualify a width
- O to qualify the optical positioning system and the associated world coordinate system
- B to qualify the calibration block and the associated block coordinate system
- H to qualify the sensor holder and the associated sensor holder coordinate system
- S to qualify the sensor and the associated sensor coordinate system To express a vector $\overrightarrow{V_1}$ in the coordinate system $R_A$, the notation $\overrightarrow{{}^AV_B}$ is used. It should be noted that a vector is used to express both a position and a displacement.

Figure 6:
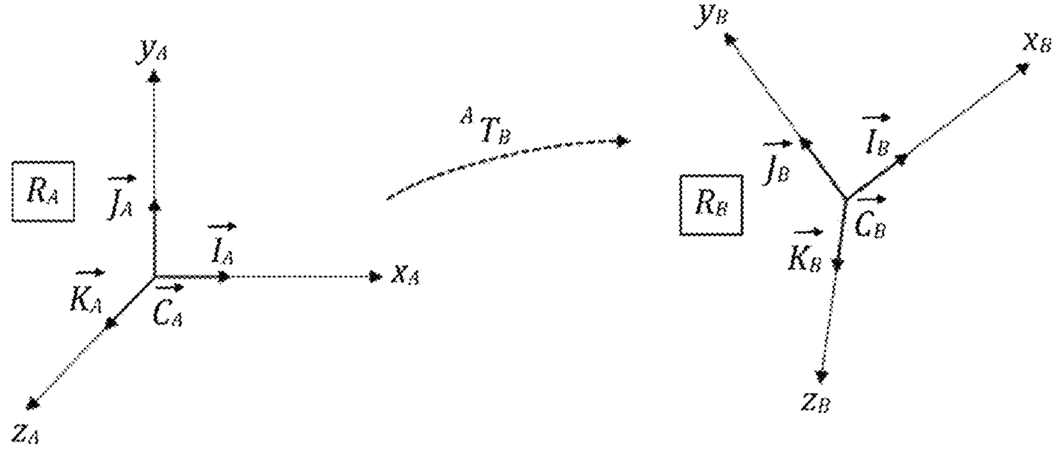
FIG. 6 schematically shows a transformation (formed of a translation and/or a rotation) for changing from a coordinate system $R_A$ to a coordinate system $R_B$.

The transformation (formed of a translation and/or a rotation) for changing from a coordinate system $R_A$ to a coordinate system $R_B$ is defined by the transformation matrix ${}^AT_B$. FIG. 6 schematically shows such a transformation. This transformation matrix of dimensions 4×4 is made up as follows:

$$ {}^AT_B = \begin{bmatrix} \overrightarrow{{}^AI_B} & \overrightarrow{{}^AJ_B} & \overrightarrow{{}^AK_B} & \overrightarrow{{}^AC_B} \\ 0 & 0 & 0 & 1 \end{bmatrix} = \begin{bmatrix} {}^AI_{x_B} & {}^AJ_{x_B} & {}^AK_{x_B} & {}^AC_{x_B} \\ {}^AI_{y_B} & {}^AJ_{y_B} & {}^AK_{y_B} & {}^AC_{y_B} \\ {}^AI_{z_B} & {}^AJ_{z_B} & {}^AK_{z_B} & {}^AC_{z_B} \\ 0 & 0 & 0 & 1 \end{bmatrix} $$

$\overrightarrow{{}^AI_B}$, $\overrightarrow{{}^AJ_B}$ and $\overrightarrow{{}^AK_B}$ respectively denote the unit vectors along the axes $x_B$, $y_B$ and $z_B$ of the coordinate system $R_B$ and expressed in the coordinate system $R_A$.

$\overrightarrow{t_B}$ is the vector expressing the origin of the coordinate system $R_B$ in the coordinate system $R_A$.

The motion tracking system 1 is capable of locating rigid bodies 2, 41 in space. A rigid body is a non-deformable collection of spherical markers reflecting infrared rays, and thus able to be located by the optical positioning system. After calibration, the motion tracking system is able to associate, with a rigid body, an origin reference frame that is used to qualify the position and the orientation of rigid bodies in the coordinate system of the motion tracking system.

It should be noted that, in order to be located correctly, the rigid bodies must be located within the solid angle seen by the motion tracking system.

The motion tracking system is supplied notably with a factory-calibrated tool for obtaining the coordinates of a point in space in the coordinate system of said motion tracking system. Hereinafter, this tool is referred to as second rigid body 41.

Two different rigid bodies are used in the calibration method of the invention: the second rigid body 41 described above and the first rigid body 2 used to locate the sensor holder 8. It is the latter, first rigid body 2 that is the subject of the calibration procedure described in this calibration step. The aim of this calibration step is to be able to determine, quickly, easily and accurately, the geometric transformation (rotation and/or translation) that exists between the origin of the first rigid body 2 as located by the motion tracking system and the point of emission of ultrasound by the sensor 3, independently of the sensor holder that is used. In other words, this calibration makes it possible to determine the geometric transformation, in the form of a transformation matrix, between the origin of the first rigid body 2 and a point of the sensor, regardless of the shape of the sensor holder necessarily placed between these two elements.

The testing device 10 according to the invention comprises:

- an optical motion tracking system 1 to which a reference coordinate system (R0) is tied,
- a sensor holder 8,
- a first rigid body 2,
- a non-destructive testing sensor 3 integral with the sensor holder 8 connected fixedly to the first rigid body 2,
- a computer 6,
- an augmented reality visualization device 16 facing the mechanical part 7, to which an augmented reality coordinate system ($R_A$) is tied.

Prior to the step of calibrating the augmented reality visualization device 16 (described in detail below) in the reference coordinate system (R0), the visualization method of the invention may comprise a step 1000 of calibrating the non-destructive testing device. Step 1000 of calibrating a device for the non-destructive testing of a mechanical part 7 may comprise, by way of example, the following steps:

- determining (100), from three points on a flat upper surface of a calibration block 14, the length and width of the calibration block;
- determining (110) a first transformation matrix from the reference coordinate system ($R_0$) to a block coordinate system ($R_B$) tied to the calibration block;
- arranging (115) the sensor 3 on the flat upper surface of the calibration block 14;
- determining (120), from three points on the first rigid body (2), the length and width of the sensor 3;
- determining (130) a second transformation matrix for changing from a coordinate system ($R_H$) tied to the sensor holder to a coordinate system ($R_S$) tied to the sensor.

It will be recalled that the calibration step is compatible with the visualization method described in detail below. However, another calibration step may be implemented instead of step 1000.

Advantageously, the calibration step may furthermore comprise a step 140 of determining a third transformation matrix for changing from the reference coordinate system ($R_0$) to the coordinate system ($R_S$) tied to the sensor. The third transformation matrix is obtained by multiplying the second transformation matrix with the first transformation matrix.

Figure 7:
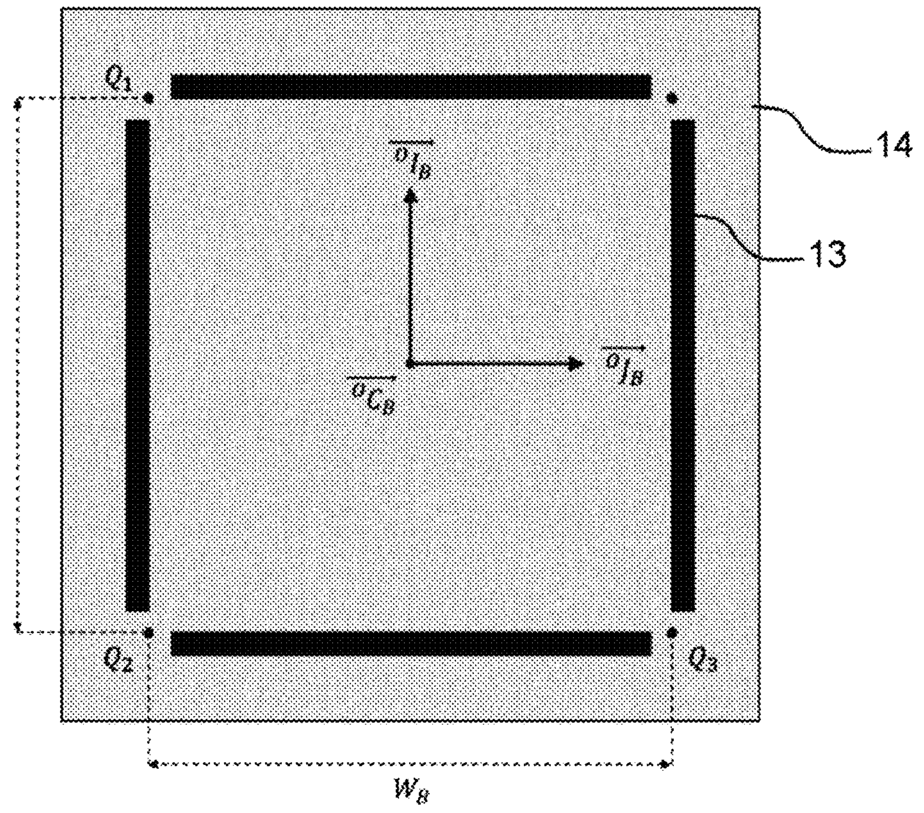
FIG. 7 schematically shows the upper surface of a calibration block implemented in the calibration method according to the invention.

The aim of steps 100 and 110 is to calibrate the calibration block 14 itself, that is to say to determine its dimensions (length and width) and to associate therewith a coordinate system $R_B$ tied to the calibration block. The motion tracking system and the calibration block must be firmly fixed in order to avoid any change in their relative positions and orientations. An operator then uses the motion tracking system and the second rigid body 41 to acquire three positions on the surface of the calibration block 14. These three positions $Q_1$, $Q_2$ and $Q_3$ are marked beforehand, advantageously but not necessarily, by small holes created for this purpose in the flat upper surface of the calibration block 14, as indicated in FIG. 7. Advantageously, these three positions are located at three vertices of a rectangle delimited by the blockers 13.

FIG. 7 schematically shows the upper surface of a calibration block implemented in the calibration step according to the invention. The calibration block is a part having a flat upper surface on which an area has been delimited by blockers 13. The dimensions of this area, which is rectangular, are known precisely. As will be clearly apparent hereinafter, the blockers 13 serve as a stop for correctly positioning the sensor and sensor holder assembly at a preferably right-angled vertex of the area.

The calibration step may comprise, prior to step 110 of determining the first transformation matrix from the reference coordinate system $R_0$ to a block coordinate system $R_B$ tied to the calibration block, a step 105 of determining the block coordinate system $R_B$ tied to the calibration block in the reference coordinate system $R_0$.

More precisely, the computer 6 receives three vectors at input:

Vector defining the first position in the reference coordinate system $R_0$: $\overrightarrow{Q_1}$ Vector defining the second position in the reference coordinate system $R_0$: $\overrightarrow{Q_2}$ Vector defining the third position in the reference coordinate system $R_0$: $\overrightarrow{Q_3}$ The computer 6 computes the following data:

Block length: $L_B$

Block width: $W_B$

Transformation matrix for changing from the reference coordinate system $R_0$ to the block coordinate system $R_B$: ${}^0T_B$ The computing steps are described in detail below.

The vector defining the center of the calibration block in the reference coordinate system $R_0$ is computed:

$$\overrightarrow{{}^OC_B} = \frac{\overrightarrow{{}^OQ_1} + \overrightarrow{{}^OQ_3}}{2}$$

The vector defining the length of the calibration block in the world coordinate system $R_0$ is computed:

$$\overrightarrow{{}^{O}L_B} = \overrightarrow{{}^{O}Q_1} - \overrightarrow{{}^{O}Q_2}$$

The vector defining the width of the calibration block in the world coordinate system $R_0$ is computed:

$$\overrightarrow{{}^{O}W_B} = \overrightarrow{{}^{O}Q_3} - \overrightarrow{{}^{O}Q_2}$$

The length of the calibration block may thus be computed:

$$L_B = \|\overrightarrow{L_B}\|$$

The width of the calibration block may also be computed:

$$W_B = \|\overrightarrow{W_B}\|$$

From these data, it is possible to compute the three unit vectors of the block coordinate system $R_B$ in the reference coordinate system $R_0$:

$$\overrightarrow{{}^{O}I_B} = \frac{\overrightarrow{{}^{O}L_B}}{L_B}$$

$$\overrightarrow{{}^{O}J_B} = \frac{\overrightarrow{{}^{O}W_B}}{W_B}$$

$$\overrightarrow{{}^{O}K_B} = \overrightarrow{{}^{O}I_B} \wedge \overrightarrow{{}^{O}J_B}$$

Finally, the transformation matrix for changing from the reference coordinate system $R_0$ to the block coordinate system $R_B$ is computed:

$${}^{O}T_B = \begin{bmatrix} \overrightarrow{{}^{O}I_B} & \overrightarrow{{}^{O}J_B} & \overrightarrow{{}^{O}K_B} & \overrightarrow{{}^{O}C_B} \\ 0 & 0 & 0 & 1 \end{bmatrix}$$

Figure 8:
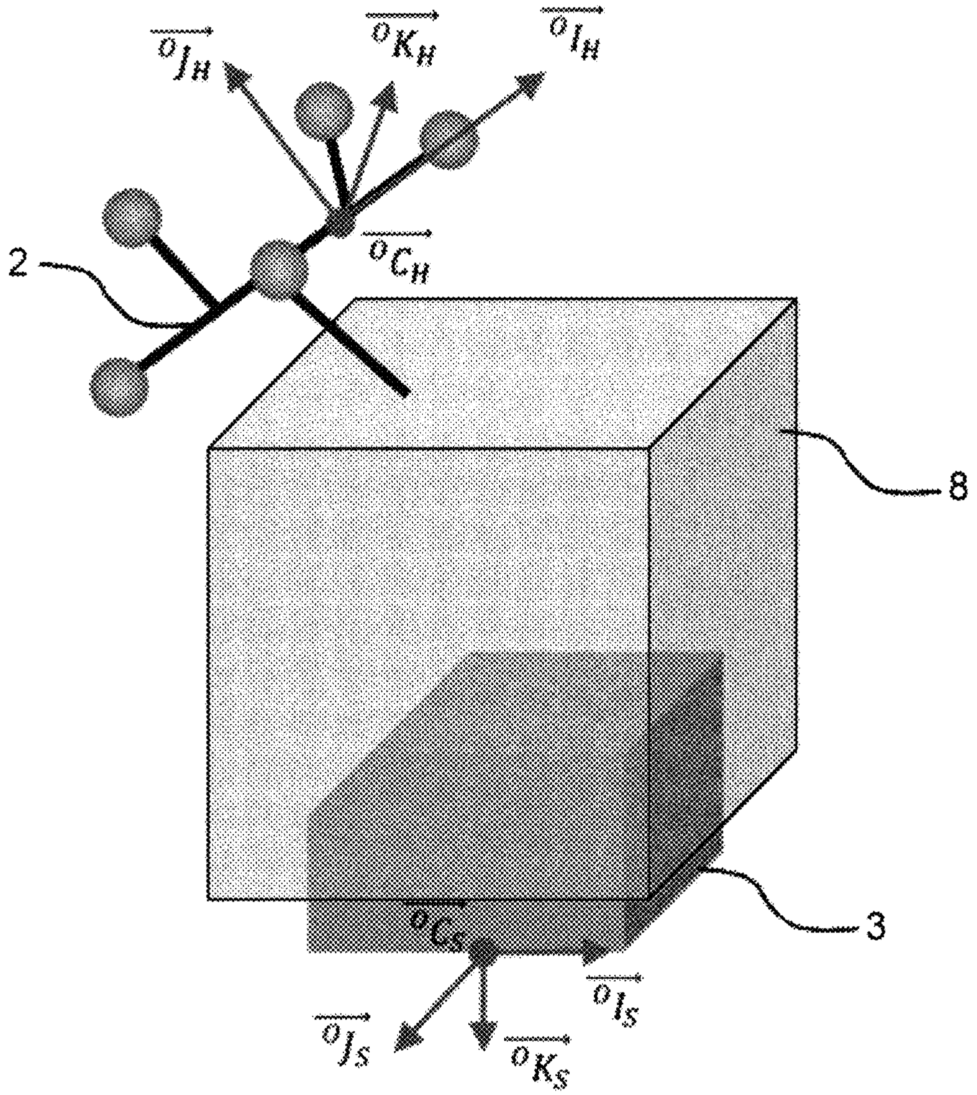
FIG. 8 schematically shows the sensor, sensor holder and first rigid body of the calibration device according to the invention.

The aim of steps 120 and 130 is to determine the dimensions of the sensor (length and width), along with the transformation matrix between the first rigid body located on the sensor holder and the center of the sensor, as indicated in FIG. 8, which schematically shows the sensor, sensor holder and first rigid body of the calibration device according to the invention.

Figure 9:
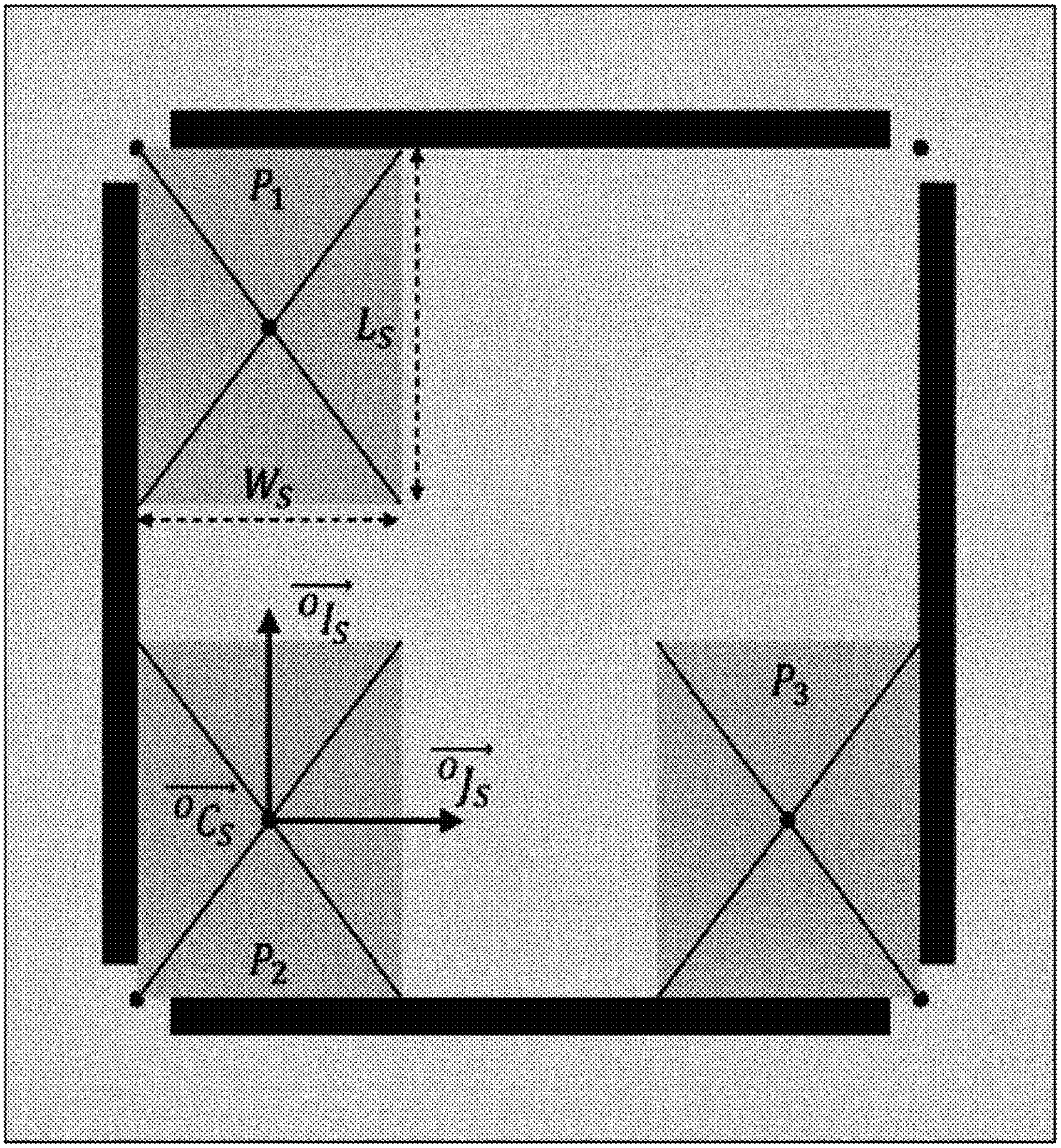
FIG. 9 schematically shows the upper surface of a calibration block implemented in the calibration method according to the invention in order to determine the length and width of the sensor.

FIG. 9 schematically shows the upper surface of a calibration block implemented in the calibration step in order to determine the length and width of the sensor.

To carry out steps 120 and 130, the sensor 3 is placed (step 115) on the flat upper surface of the calibration block 14. The operator acquires three positions of the first rigid body present on the sensor holder, as may be seen in FIG. 9. These three positions $P_1$, $P_2$ and $P_3$ correspond respectively to the upper-left, lower-left and lower-right corners. It should be noted that it is possible to choose a combination of corners different therefrom.

It should be noted that the sensor holder is designed such that it is the sensor itself, and not the sensor holder, that comes into contact with the edges (blockers) of the calibration block when the sensor holder is brought into the positions $P_1$, $P_2$ and $P_3$.

In addition to the previously available data, the computer 6 receives three vectors at input:

Vector defining the first position in the reference coordinate system $R_0$: $\overrightarrow{P_1}$ Vector defining the second position in the reference coordinate system $R_0$: $\overrightarrow{P_2}$ Vector defining the third position in the reference coordinate system $R_0$: $\overrightarrow{P_3}$ The computer 6 computes the following data:

Sensor length: $L_S$

Sensor width: $W_S$

Transformation matrix for changing from the sensor holder coordinate system $R_H$ to the sensor coordinate system $R_S$: ${}^{H}T_S$ The computing steps are described in detail below.

The following vectors are computed:

$$\overrightarrow{{}^{O}P_{21}} = \overrightarrow{{}^{O}P_1} - \overrightarrow{{}^{O}P_2}$$

$$\overrightarrow{{}^{O}P_{23}} = \overrightarrow{{}^{O}P_3} - \overrightarrow{{}^{O}P_2}$$

The length of the sensor is computed:

$$L_S = L_B - \|\overrightarrow{{}^{O}P_{21}}\|$$

The width of the sensor is computed:

$$W_S = W_B - \|\overrightarrow{{}^{O}P_{23}}\|$$

Finally, the three unit vectors of the sensor coordinate system $R_S$ in the reference coordinate system $R_0$ are computed:

$$\overrightarrow{I_S} = \overrightarrow{I_B}$$

$$\overrightarrow{J_S} = \overrightarrow{J_B}$$

$$\overrightarrow{K_S} = \overrightarrow{K_B}$$

It is then possible to compute the transformation matrix for changing from the sensor holder coordinate system $R_H$ to the reference coordinate system $R_0$, the sensor holder being in $P_3$:

$${}^{O}T_H = \begin{bmatrix} \overrightarrow{{}^{O}I_S} & \overrightarrow{{}^{O}J_S} & \overrightarrow{{}^{O}K_S} & \overrightarrow{{}^{O}P_3} \\ 0 & 0 & 0 & 1 \end{bmatrix}$$

$${}^{H}T_O$$

In other words, the calibration step described in detail here comprises, prior to step 125 of determining the coordinate system $R_S$ tied to the sensor in the coordinate system $R_H$ tied to the sensor holder, a step 123 of determining a fourth transformation matrix for changing from the coordinate system $R_H$ tied to the sensor holder to the reference coordinate system $R_0$.

The following step consists in computing the coordinates of the center of the sensor in the reference coordinate system $R_0$ (the computing is carried out for the sensor holder in $P_3$):

$$\overrightarrow{{}^{O}C_S} = \overrightarrow{{}^{O}Q_3} - \left(\frac{L_S \times \overrightarrow{{}^{O}I_S}}{2}\right) - \left(\frac{W_S \times \overrightarrow{{}^{O}J_S}}{2}\right)$$

It is also necessary to compute the three unit vectors of the sensor coordinate system $R_S$ in the sensor holder coordinate system $R_H$:

$$\overrightarrow{{}^{H}I_S} = {}^{H}T_O \times \overrightarrow{{}^{O}I_S}$$

$$\overrightarrow{{}^{H}J_S} = {}^{H}T_O \times \overrightarrow{{}^{O}J_S}$$

$$\overrightarrow{{}^{H}K_S} = \overrightarrow{{}^{H}I_S} \wedge \overrightarrow{{}^{G}J_S}$$

Finally, the center of the sensor coordinate system $R_S$ is computed in the sensor holder coordinate system $R_H$:

$$\overrightarrow{{}^{H}C_S} = {}^{H}T_O \times \overrightarrow{{}^{O}C_S}$$

In other words, the calibration step comprises, prior to step 130 of determining the second transformation matrix for changing from a coordinate system $R_H$ tied to the sensor holder to a coordinate system $R_S$ tied to the sensor, a step 125 of determining the coordinate system $R_S$ tied to the sensor in the coordinate system $R_H$ tied to the sensor holder.

Finally, it is possible to compute the transformation matrix for changing from the sensor holder coordinate system $R_H$ to the sensor coordinate system $R_S$:

$${}^{H}T_S = \begin{bmatrix} \overrightarrow{{}^{H}I_S} & \overrightarrow{{}^{H}J_S} & \overrightarrow{{}^{H}K_S} & \overrightarrow{{}^{H}C_S} \\ 0 & 0 & 0 & 1 \end{bmatrix}$$

It will be recalled that this calibration step is given by way of indication. Other calibrations are also compatible with the visualization method described in detail below. In what has just been described, the sensor holder may be calibrated directly using a tool for recording the positions of various characteristic points. Using the calibrated calibration block naturally makes it possible to integrate a coplanarity constraint that increases the accuracy of the calibration. It is the combination of calibration of the calibration block and of the sensor that gives this calibration method a particularly beneficial aspect. This results in great simplicity and speed of implementation along with a significant improvement in the accuracy of the calibration compared to a conventional method.

After this preliminary step of calibrating the non-destructive testing device 10, the core of the invention, relating to the display of the data, is described in detailed below.

The object of the invention lies in visualizing, in augmented reality, the signals directly inside the mechanical part in the field of non-destructive testing. To this end, the invention is based on two aspects. On the one hand, the elements in the scene must be presented in the form of holographic occlusions so that the brain is able to correctly interpret the position and depth of the holographic 3D surface inside the part. And, on the other hand, a cut-out is produced within the occlusion in order to allow this holographic 3D surface to be visualized. The orientation of this cut-out is related to the relative position of the operator. More precisely, the orientation of the cut-out 80 is related to the location of the augmented reality visualization device. This cut-out and the signal visualization surface constructed from the ultrasonic paths thus face the augmented reality visualization device, and therefore the eyes of the operator. The major advantage of the invention is that of allowing the user to understand the positioning of signals inside the part and to achieve a real-time visualization of spatialized data in augmented reality.

Figure 10:
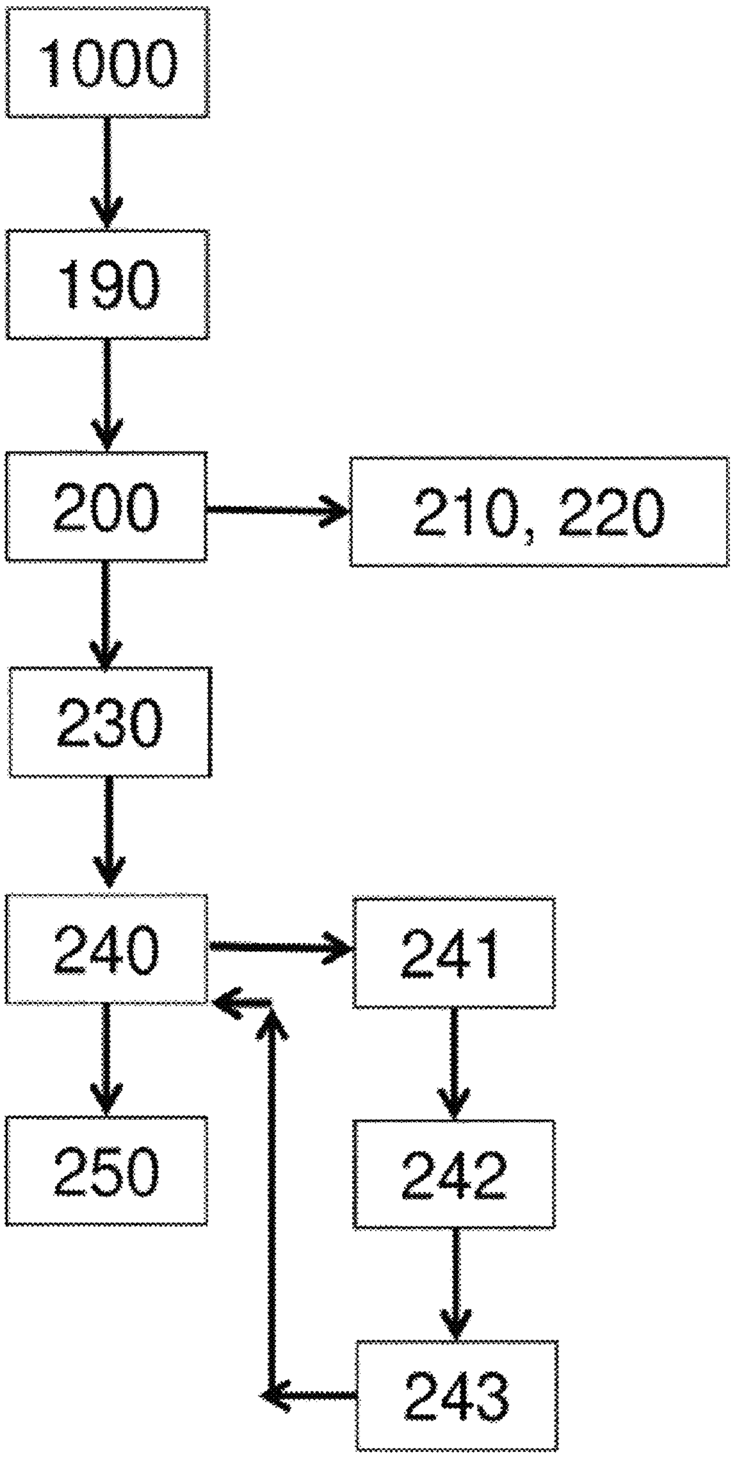
FIG. 10 schematically shows a flowchart of the steps of the method for visualizing, in real time, a signal for the non-destructive testing of a mechanical part according to the invention.

FIG. 10 schematically shows a flowchart of the steps of the method for visualizing, in real time, a signal for the non-destructive testing of a mechanical part according to the invention. The signal is emitted by the non-destructive testing device 10 described above. According to the invention, the visualization method comprises the following steps:

- Moving (step 200) the non-destructive testing sensor 3 over an examination area of the mechanical part 7;
- At the same time as the step 200 of moving the non-destructive testing sensor 3, emitting (step 210) the signal from a point of emission F along an emission axis and receiving (step 220) the signal by way of the sensor 3;
- Determining (step 230) a cut-out 80 of an occlusion inside the mechanical part 7, the cut-out 80 being centered around the point of emission F;
- Determining (step 240) a signal visualization surface 81 constructed from the ultrasonic paths of the signal, this surface being located inside the cut-out 80;
- Visualizing (step 250), on the augmented reality visualization device 16,
- a real view of the mechanical part 7, of the sensor holder 8 and of the non-destructive testing sensor 3,
- a holographic 3D representation of the mechanical part 7', of the sensor holder 8' and of the non-destructive testing sensor 3', which are superimposed on the real view,
- a holographic representation of the cut-out 80 of the occlusion of the part and of the signal visualization surface 81, which are superimposed on the real view.

Figure 11:
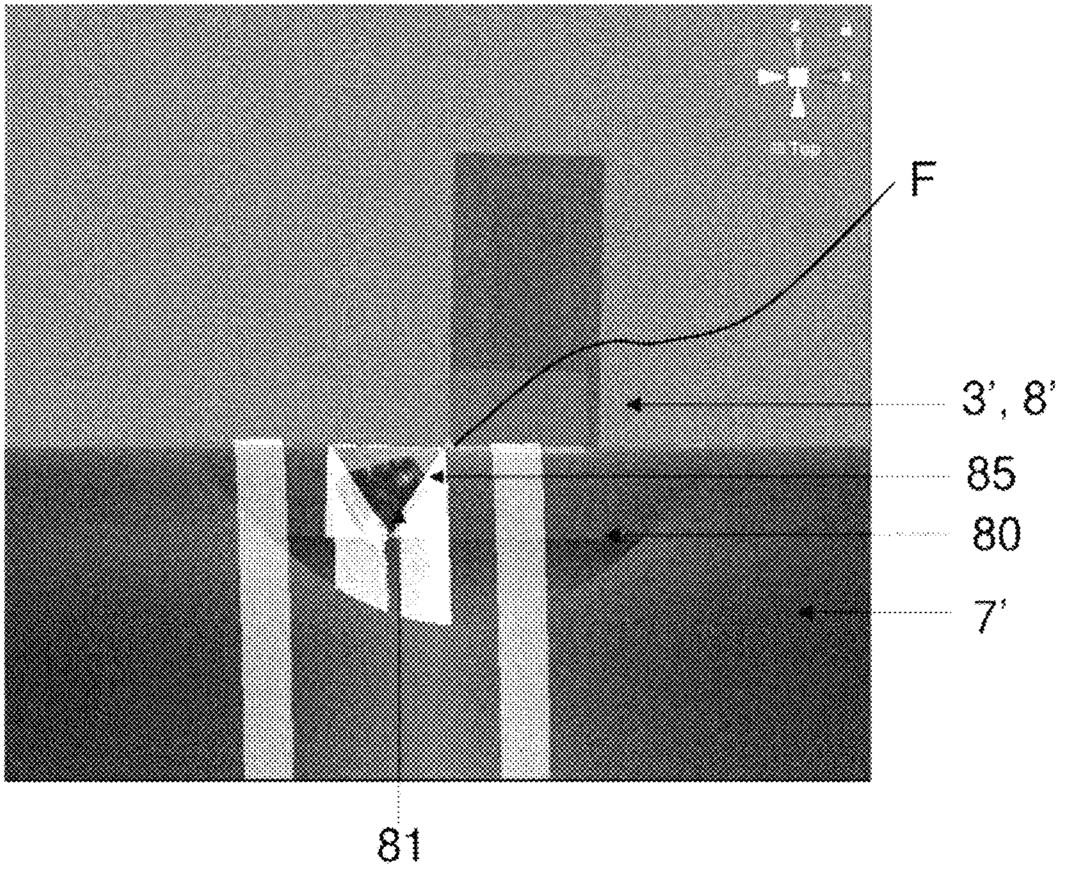
FIG. 11 illustrates the display obtained in the augmented reality visualization device with the visualization method according to the invention.

FIG. 11 illustrates the display obtained in the augmented reality visualization device with the visualization method according to the invention. The cut-out 80 corresponds to a substantially semi-hemispherical or ellipsoidal 3D surface. In other words, the cut-out 80 is a representation of a section of a volume in the mechanical part 7, around the point F. The reference 85 represents a weld in the mechanical part 7.

The cut-out 80 is a 3D surface that passes through the depth of the occlusion until reaching an ultrasonic path acquisition surface, which corresponds to an ultrasonic signal visualization surface 81. The cut-out of the occlusion thus corresponds to the intersection between the 3D surface and the visualization surface.

For example, the cut-out 80 is produced in the holographic 3D representation of the mechanical part 7' as illustrated in FIG. 11 in the case where the occlusion is due at least partially to the superposition of the holographic 3D representation and of the real view of the mechanical part.

The cut-out 80 is predetermined such that the operator is able to visualize the paths of the ultrasonic signals inside the mechanical part in its holographic 3D representation 7', that is to say inside this cut-out 80 in the part. The position of the ellipsoid is centered notably on a point of the sensor chosen as a reference. The rotation and dimensions of the ellipsoid are computed based on the position of the operator in relation to the sensor and the part, in order to allow all of the signals to be visualized by this same operator.

The visualization method thus makes it possible to obtain a display in the augmented reality visualization device 16.

The operator sees there, through the visualization device 16, the mechanical part 7, the sensor holder 8 and the sensor 3. In addition to these real objects, the display comprises a holographic 3D representation 7' of the mechanical part, a holographic 3D representation 8' of the sensor holder, and a holographic 3D representation 3' of the sensor. These three holographic 3D representations are superimposed on the display of the real objects. In addition to the real objects and these holographic 3D representations superimposed on the real objects, the display comprises the holographic 3D representation of the cut-out of the occlusion 80 and of the intersection surface 81 or ultrasonic signal visualization surface, superimposed on the holographic 3D representations superimposed on the real objects. This surface corresponds to a quadric that is computed to be as close as possible to the mesh formed by the ultrasonic paths.

In the rest of the document, we will refer to the following coordinate systems:

- Coordinate system of the augmented reality visualization system, under the name RA coordinate system: $R_{RA}$
- Coordinate system of the target, under the name QRCode coordinate system: $R_{QR}$ The visualization method according to the invention comprises, beforehand, a step 190 of calibrating the augmented reality visualization device 16 in the reference coordinate system ($R_0$).

Figure 12:
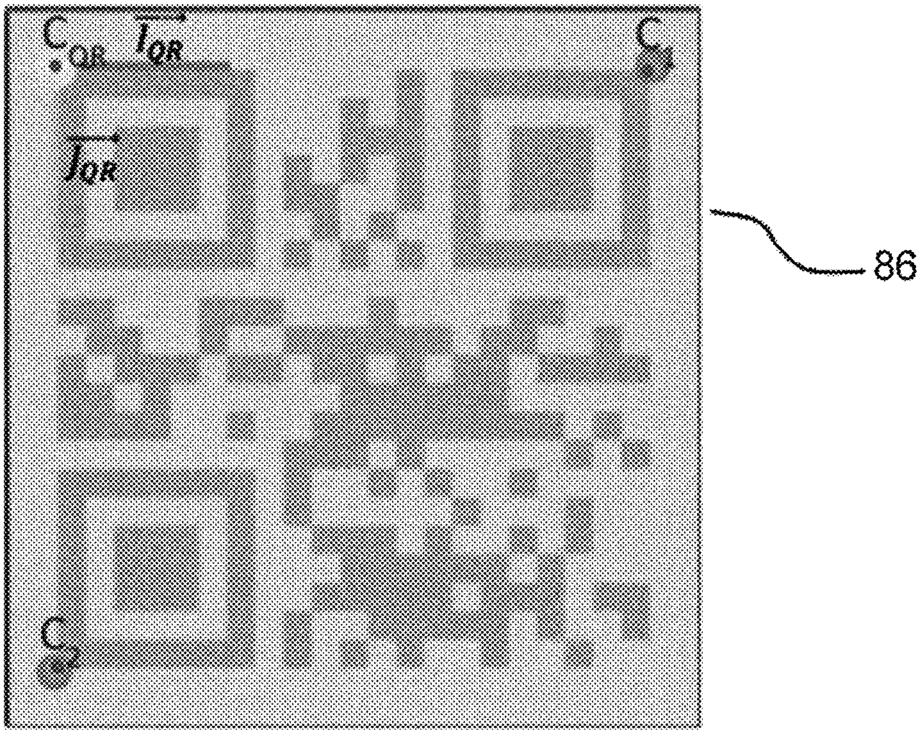
FIG. 12 schematically shows the QR code implemented in the step of calibrating the augmented reality visualization device in the reference coordinate system of the visualization method according to the invention.

FIG. 12 schematically shows the QR code implemented in step 190 of calibrating the augmented reality visualization device in the reference coordinate system of the visualization method according to the invention.

In order to define the position of the elements known in the world coordinate system in the coordinate system of the augmented reality visualization device, it is necessary to calibrate the augmented reality visualization device. The augmented reality visualization device establishes an anchor, that is to say a coordinate system at the location of the QR code. During the calibration, this coordinate system is positioned in the world coordinate system, defined by the optical positioning system. The calibration makes it possible to establish the relationship between the two worlds.

In the world of the augmented reality visualization device, the coordinate system $R_{QR}$ associated with the QR code 86 is defined as shown in FIG. 12. To calibrate this coordinate system $R_{QR}$ in the world coordinate system, the three positions $C_{QR}$, $C_1$ and $C_2$ in the world coordinate system are acquired. Next, the QR code 86 is acquired by the augmented reality visualization device and an internal transformation ${}^{QR}T_{RA}$ is carried out, which, combined with the matrix ${}^{0}T_{QR}$, makes it possible to position, in the coordinate system RA, all the elements positioned and tracked in the world coordinate system. In a manner similar to what was described in detail above for the calibration step 1000, we have the following relationships here:

$$ {}^{O}T_{QR} = \begin{bmatrix} \overrightarrow{{}^{O}I_{QR}} & \overrightarrow{{}^{O}J_{QR}} & \overrightarrow{{}^{O}K_{QR}} & \overrightarrow{{}^{O}C_{QR}} \\ 0 & 0 & 0 & 1 \end{bmatrix} $$

The vector $\overrightarrow{I_{QR}}$ in the world coordinate system is:

$$ \overrightarrow{{}^{O}I_{QR}} = \frac{\overrightarrow{C_{QR}C_1}}{\|\overrightarrow{C_{QR}C_1}\|} $$

The vector $\overrightarrow{J_{QR}}$ in the world coordinate system is:

$$ \overrightarrow{{}^{O}J_{QR}} = \frac{\overrightarrow{C_{QR}C_2}}{\|\overrightarrow{C_{QR}C_2}\|} $$

The vector $\overrightarrow{K_{QR}}$ in the world coordinate system is:

$$ \overrightarrow{{}^{O}K_{QR}} = \overrightarrow{{}^{O}I_{QR}} \wedge \overrightarrow{{}^{O}J_{QR}} $$

Figure 13:
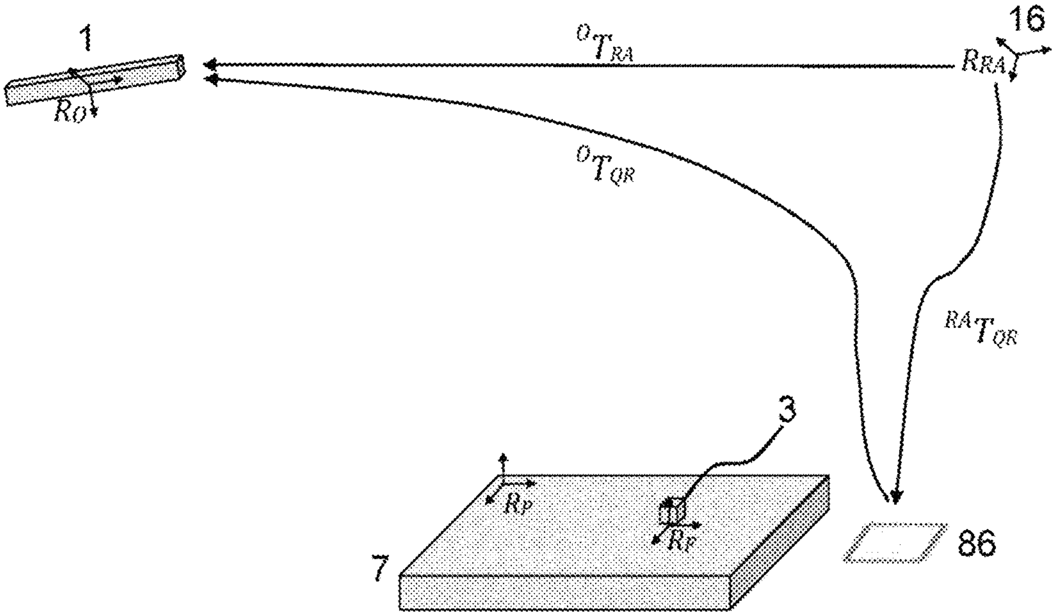
FIG. 13 schematically shows the transformation matrices in the visualization method according to the invention.

FIG. 13 schematically shows the transformation matrices in the visualization method according to the invention.

The calibration step 1000 defines and describes how to obtain the following transformation matrices by calibration:

- the transformation matrix for changing from the sensor coordinate system $R_F$ to the world coordinate system $R_0$: ${}^{F}T_0$. Inverting this matrix also gives ${}^{0}T_F$;
- the transformation matrix for changing from the part coordinate system $R_P$ to the world coordinate system $R_0$: ${}^{P}T_0$. Inverting this matrix also gives ${}^{0}T_P$.
- the transformation matrix for changing from the RA coordinate system $R_{RA}$ to the world coordinate system $R_0$: ${}^{RA}T_0$. Inverting this matrix also gives ${}^{0}T_{RA}$.

Figure 14:
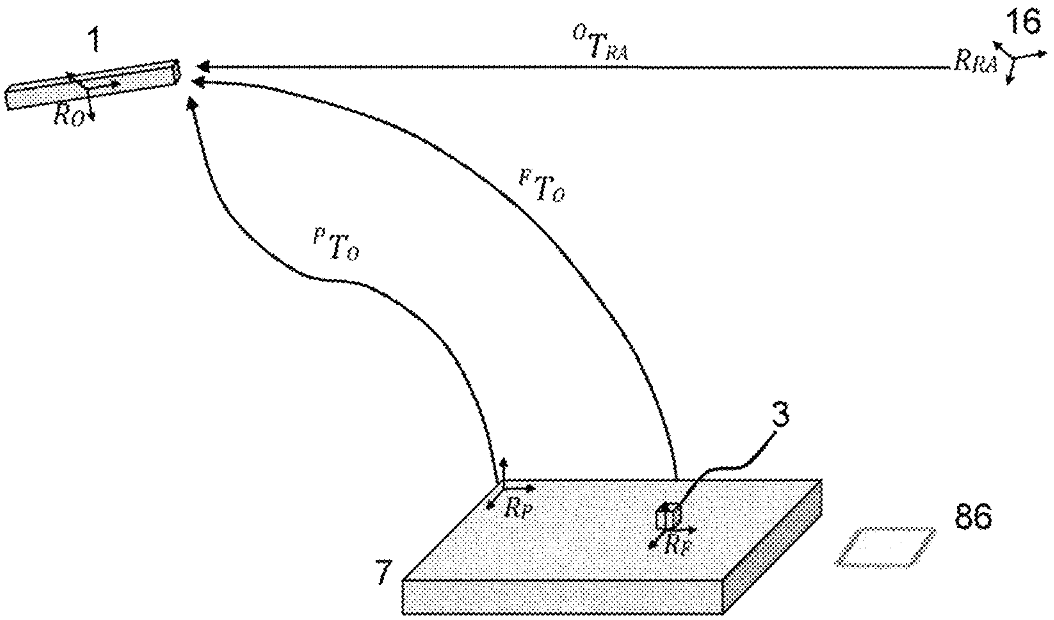
FIG. 14 schematically shows the transformation matrices in the visualization method according to the invention.

FIG. 14 schematically shows these transformation matrices in the visualization method according to the invention.

It is possible to position the origin F of the sensor 3 in the part coordinate system $R_P$:

$$ {}^{P}P_F = {}^{P}T_0({}^{0}P_F) $$

The information/spatially related to this point F such as the ultrasonic paths and the sectorial scan reconstructed therefrom and physical signals may then be located in the coordinate system of the augmented reality visualization device $R_{RA}$:

$$ {}^{RA}P_I = {}^{RA}T_0({}^{0}P_I) $$

In order to clarify the various elements of the 3D scene to be visualized, the 3D object containing the signals to be visualized by the operator may be denoted hereinafter as "main object", and the 3D objects with respect to which the main object is positioned (notably the part and the sensor) may be denoted as "secondary objects". It should be noted that, in the case of augmented reality, each of the objects described above is visualized in the form of a hologram and is superimposed perfectly on a real object, thus creating an occlusion of this real object.

As already mentioned, the objective of the method of the invention is to allow the user to visualize the main object formed from ultrasonic data (sectorial scan for example) and to position it in 3D in augmented reality, giving the user the impression of visualizing it inside the part.

For the human being to correctly visually interpret the positioning of this main object in the 3D visual space, it is not enough to display the hologram of this main object. The hologram will give the impression of floating, and its spatial relationship with the volume of the part will be lost. In our case described here, the volume in question is the volume passed through by the ultrasonic signals used to construct this main object.

The invention consists in displaying the hologram of this main object accompanied by a set of graphic occlusions corresponding to the holograms of the secondary objects. The secondary objects are notably the part and the sensor (accompanied by its sensor holder). For these occlusions not to completely conceal the real objects, the occlusions advantageously have a medium transparency level. The graphic occlusions of the part (possibly comprising a weld to be tested) and of the sensor are therefore produced with textures and colors having a transparency percentage.

In order for the brain to interpret the main object as forming part of the internal integrity of the part (and possibly of the weld), this main object must appear on the graphic occlusion of the part. In order to achieve this objective, a transparent opening of the graphic occlusions of the part is produced. This is the cut-out 80 of the occlusion formed by the virtual representation of the main object. This opening is centered on the sensor (more precisely the point F of the sensor, the point with respect to which the main object to be displayed is located). This opening or cut-out 80 is also a 3D object, and a portion of the surface of its volume is coincident with the surface of the main object.

In order not to disturb the operator with information outside their field of view (for example the back of the part), the visible data, and therefore the direction of the opening, are selected according to the position and orientation of the eye of the operator. Thus, if the operator visualizes the holograms from the front or back of the part, the holograms remain oriented correctly. This is made possible by calibrating the visualization device 16 with respect to the motion tracking device 1.

Step 240 of determining the intersection surface 81 or ultrasonic path visualization surface comprises the following steps:

- Computing (step 241) the paths taken by the signal emitted by the sensor 3;
- Creating (step 242) a 3D mesh representative of the mechanical part 7, of the sensor holder 8, of the non-destructive testing sensor 3, and of the paths taken by the signal;
- Mapping (step 243) the paths taken by the signal onto the 3D mesh.

In other words, step 240 makes it possible to visualize a sectorial scan within the augmented reality visualization device 16. This is the intersection surface 81 of the plane containing the emission axis in the cut-out 80 of the occlusion.

The signal visualization surface 81 is determined, on the one hand, from the characteristics of the sensor, such as its position relative to the part to be imaged and the characteristics of the emitted signals, notably their orientations in the part. It is determined, on the other hand, from the cut-out 80 of the part as being included in this cut-out 80 and representing for example the bottom surface of this cut-out 80.

The signal visualization surface 81 changes with each new acquisition of signals, notably if the position of the sensor and/or the orientations of the signals change.

By virtue of the invention, it is thus possible for the operator to visualize secondary objects (that is to say real objects: mechanical part 7 to be tested, the sensor holder 8 and the sensor 3), on which the main object containing the signals to be visualized, that is to say the assembly formed by the cut-out 80 and the surface 81, is superimposed.

In one particular embodiment, the steps of the method according to the invention are implemented by computer program instructions. Consequently, the invention also targets a computer program on an information medium, this program being able to be implemented in a computer, this program comprising instructions designed to implement the steps of a method as described above.

This program may use any programming language, and may be in the form of source code, object code, or intermediate code between source code and object code, such as in a partially compiled form, or any other desirable form. The invention also targets a computer-readable information medium comprising computer program instructions designed to implement the steps of a method as described above.

The information medium may be any entity or device capable of storing the program. For example, the medium may comprise a storage means, such as a ROM, for example a CD-ROM or a microelectronic circuit ROM, or else a magnetic recording means, for example a floppy disk or a hard disk.

Moreover, the information medium may be a transmissible medium such as an electrical or optical signal, which may be routed via an electrical or optical cable, by radio or by other means. The program according to the invention may in particular be downloaded on an Internet type network.

As an alternative, the information medium may be an integrated circuit in which the program is incorporated, the circuit being designed to execute or to be used in the execution of the method according to the invention.

It will be apparent more generally to those skilled in the art that various modifications may be made to the embodiments described above, in the light of the teaching that has just been disclosed to them. In the claims that follow, the terms that are used should not be interpreted as limiting the claims to the embodiments set out in the present description, but should be interpreted so as to include therein all of the equivalents that the claims are intended to cover by virtue of their wording and as may be foreseen by those skilled in the art on the basis of their general knowledge.

The invention claimed is:

1. A method for visualizing, in real time, a signal for the non-destructive testing of a mechanical part, the signal being emitted by a non-destructive testing device, the method comprising:

- providing the non-destructive testing device comprising:
  - an optical motion tracking system to which a reference coordinate system ($R_0$) is tied,
  - a sensor holder,
  - a rigid body,
  - a non-destructive testing sensor integral with the sensor holder connected fixedly to the rigid body, and
  - a computer;
- the method being executed by an augmented reality visualization device facing the mechanical part, to which an augmented reality coordinate system (RA) is tied,
- the method further comprising the steps of:
- moving the non-destructive testing sensor over an examination area of the mechanical part;
- at the same time as the step of moving the non-destructive testing sensor, emitting the signal from a point of emission along an emission axis and receiving the signal by way of the sensor;
- determining, by way of the computer, a cut-out of an occlusion inside the mechanical part, the cut-out being centered around the point of emission;
- determining, by way of the computer, a signal visualization surface constructed from paths of the signal, this surface being located inside the cut-out;
- visualizing, on the augmented reality visualization device, a real view of the mechanical part, of the sensor holder and of the non-destructive testing sensor, a holographic 3D representation of the mechanical part, of the sensor holder and of the non-destructive testing sensor, which are superimposed on the real view, and a holographic representation of the cut-out of the occlusion of the part and of the signal visualization surface, which are superimposed on the real view, the occlusion being produced at least partially by superimposing the holographic 3D representation of the mechanical part on the real view of the mechanical part, the cut-out of the occlusion passing through the depth of the mechanical part in its holographic 3D representation until reaching the signal visualization surface, the signal visualization surface being a quadric that is determined so as to correspond to a mesh formed by the paths of said signals propagating in the mechanical part.

2. The visualization method as claimed in claim 1, wherein the orientation of the cut-out is related to a location of the augmented reality visualization device.

3. The visualization method as claimed in claim 1, wherein the holographic 3D representations are visualized in transparency.

4. The visualization method as claimed in claim 1, wherein the step of determining the visualization surface comprises the following steps:

computing the paths taken by the signal emitted by the sensor;

creating a 3D mesh representative of the mechanical part, of the sensor holder, of the non-destructive testing sensor, and of the paths taken by the signal; and mapping the paths taken by the signal onto the 3D mesh.

5. The visualization method as claimed in claim 1, comprising, beforehand, a step of calibrating the augmented reality visualization device in the reference coordinate system ($R_0$).

6. The visualization method as claimed in claim 5, comprising, prior to the step of calibrating the augmented reality visualization device in the reference coordinate system ($R_0$), a step of calibrating the non-destructive testing device.

7. A non-transitory computer-readable storage medium having stored thereon a computer program comprising instructions to carry out the steps of the method as claimed in claim 1.

8. A device for visualizing, in real time, a signal for the non-destructive testing of a mechanical part, the device comprising a non-destructive testing device comprising:

an optical motion tracking system to which a reference coordinate system ($R_0$) is tied, a sensor holder, a first rigid body, a non-destructive testing sensor integral with the sensor holder connected fixedly to the first rigid body, the sensor being intended to be moved over an examination area of the mechanical part, and to emit the signal from a point of emission and receive the signal along an emission axis, and a computer;

the device further comprising an augmented reality visualization device facing the mechanical part, to which an augmented reality coordinate system ($R_A$) is tied, the computer being configured to:

determine a cut-out of the occlusion of the mechanical part, the cut-out being centered around the point of emission;

determine a signal visualization surface constructed from paths of the signal, this surface being located inside the cut-out;

and the augmented reality visualization device is configured to display:

a real view of the mechanical part, of the sensor holder and of the non-destructive testing sensor, a holographic representation of the mechanical part, of the sensor holder and of the non-destructive testing sensor, which are superimposed on the real view, and a holographic representation of the cut-out of the occlusion of the part and of the signal visualization surface, which are superimposed on the real view, the occlusion being produced at least partially by superimposing the holographic 3D representation of the mechanical part on the real view of the mechanical part, the cut-out of the occlusion passing through the depth of the mechanical part in its holographic 3D representation until reaching the signal visualization surface, the signal visualization surface being a quadric that is determined so as to correspond to a mesh formed by the paths of said signals propagating in the mechanical part.

9. The device as claimed in claim 8, further comprising a pointing device comprising a tip and connected fixedly to a second rigid body, the pointing device being able to determine the position of points on a surface.

* * * * *